United States Patent [19]
Bhagavatula

[11] Patent Number: 5,909,529
[45] Date of Patent: Jun. 1, 1999

[54] METHOD OF MANUFACTURING PLANAR GRADIENT-INDEX WAVEGUIDE LENSES

[75] Inventor: Venkata Adiseshaiah Bhagavatula, Big Flats, N.Y.

[73] Assignee: Corning Incorporated, Corning, N.Y.

[21] Appl. No.: 08/882,087

[22] Filed: Jun. 25, 1997

Related U.S. Application Data

[60] Provisional application No. 60/027,696, Oct. 10, 1996.

[51] Int. Cl.$^6$ ..................................................... G02B 6/10
[52] U.S. Cl. ............................ 385/147; 65/386; 385/129; 385/130
[58] Field of Search ............................. 65/386, 387, 435, 65/406, 411, 433; 385/129–132, 147, 33

[56] References Cited

U.S. PATENT DOCUMENTS

| | | | |
|---|---|---|---|
| 3,923,373 | 12/1975 | Dabby et al. | 350/96.12 |
| 4,248,614 | 2/1981 | Scherer | 350/96.33 |
| 4,418,980 | 12/1983 | Keil et al. | 350/96.13 |
| 4,701,009 | 10/1987 | Tangonan et al. | 350/96.12 |
| 4,715,027 | 12/1987 | Mahapatra et al. | 370/3 |
| 4,805,997 | 2/1989 | Asahara et al. | 350/413 |
| 4,919,504 | 4/1990 | Colas et al. | 350/96.12 |
| 5,125,946 | 6/1992 | Bhagavatula | 65/106 |
| 5,157,746 | 10/1992 | Tobita et al. | 385/33 |
| 5,178,658 | 1/1993 | Tumminelli et al. | 65/386 |
| 5,243,677 | 9/1993 | Kanamori et al. | 385/130 |

OTHER PUBLICATIONS

"Analysis and Evaluation of Graded–Index Fiber–Lenses" by William L. Emkey & Curtis A. Jack, Journal of Lightwave Technology, vol. LT-.5 No. 9, Sep. 1987 pp. 1156–1164.

"Introduction to Graded–Index Rod Lenses", Grid–Rod Lens Starter Kit F–GRKI Instruction Manual, Fiber Optics Newport Corporation May 1986, pp. 1, 3, 5, 7, 9, 11, & 13.

*Primary Examiner*—Hung N. Ngo
*Attorney, Agent, or Firm*—William Greener

[57] ABSTRACT

A core layer of a planar gradient-index waveguide lens is formed from a longitudinal section of a graded-index blank. The longitudinal section is mounted on a substrate that provides support for subsequent operations on the longitudinal section and that also functions as a cladding layer of the waveguide lens. The longitudinal section can be machined or redrawn in a furnace together with the substrate to a final thickness dimension.

45 Claims, 4 Drawing Sheets

METHOD OF MANUFACTURING PLANAR GRADIENT-INDEX WAVEGUIDE LENSES

This application claims the benefit of U.S. Provisional Application Ser. No. 60/027,696, filed on Oct. 10, 1996, which provisional application is incorporated by reference herein.

TECHNICAL FIELD

The invention relates to optical waveguides containing planar gradient-index waveguide lenses and particularly to the manufacture of such lenses.

BACKGROUND

Gradient-index (GRIN) lenses have a refractive index that varies in one or more coordinate directions. Generally, the refractive index varies in a direction transverse to the intended direction of propagation through the lenses. Parabolic or Gaussian distributions are used for the shape of the index profiles. (Note: The term "index" refers to "refractive index" throughout this specification.)

Three-dimensional GRIN lenses (generally in the 1 to 3 millimeter diameter range) can be made by an ion-exchange process in which a silica glass rod doped with thallium or cesium is immersed in a molten potassium salt bath. Potassium ions from the bath replace some of the thallium or cesium ions in the glass rod by diffusion, leaving a distribution of dopant that progressively decreases toward the periphery of the rod. Such ion distributions provide parabolic-like index profiles in the rods.

Smaller three-dimensional GRIN lenses (e.g., 125 micron diameter) can be made from conventional multi-mode fibers that already have graded-index profiles. The conventional fibers are cleaved to a specific lengths for controlling focusing qualities of the resulting lens. A paper entitled "Analysis and Evaluation of Graded-Index Fiber-Lenses" by W. L. Emkey et al. published in the Journal of Lightwave Technology, Vol. LT-5, No. 9, September 1987 discusses the performance of such fiber lenses.

Two-dimensional (planar) GRIN lenses are more difficult to make. In fact, planar waveguides themselves in which the two-dimensional GRIN lenses are formed require a complex sequence of operations starting with a substrate and laying down successive layers of lower refractive-index cladding surrounding a layer of higher refractive-index core. The required refractive-index profiles are produced by controlling the distribution of dopant in the core layer of the waveguide. The dopant, which typically increases the refractive index in proportion to its concentration, is distributed in concentrations matching the desired index profile. Higher concentrations are distributed at the center of the core, and progressively lower concentrations are distributed approaching the surrounding cladding.

U.S. Pat. No. 4,418,980 to Keil et al. describes the manufacture of planar GRIN lenses through diffusion of titanium into a lithium niobate crystal core. During a sputtering or vapor deposition operation, a shadow mask or variable diaphragm is used to control areas of the core exposed to the dopant. Alternatively, the core can be variably doped by ion implantation.

U.S. Pat. No. 5,157,746 to Tobita et al. describes similar methods for forming planar GRIN lenses. A core layer of PMMA contains styrene or other resin material whose refractive index can be varied through photo polymerization. Ultraviolet light irradiates the core layer through one or more relatively movable masks for varying the amount of area exposed to the light. The resulting index of the core areas varies with the exposure time.

All of these methods are very difficult and expensive to carry out to required accuracy. Most require movements of masks or other apparatus that are difficult to time with other processing variables and can lead to contamination of the core. The various deposition techniques also produce irregularities at interfaces between the core and cladding resulting in reduced transmission efficiencies.

SUMMARY OF INVENTION

My invention avoids the difficulties of dispersing dopant in planar waveguides by forming the core layer of a planar gradient-index (GRIN) lens from a section of a graded-index blank. Such blanks have already been used for drawing the fibers of three-dimensional GRIN lenses, but up to now have not found any corresponding use for making two-dimensional planar GRIN lenses.

One starting point for practicing my invention involves removing a longitudinal section from a graded-index blank at a first thickness. The longitudinal section is mounted on a substrate with the intention that the longitudinal section will form the core layer of a planar waveguide and the substrate will form an undercladding.

Although the longitudinal section removed from the graded-index blank is preferably as thin as possible, the minimum section thickness (e.g. 300–500 microns) that can be practically removed is generally much thicker than the typical thickness (e.g., 5–10 microns) of the core layer of single-mode waveguides. Even for multi-mode waveguides, some thickness adjustment may be required to achieve required performance or to match the dimensions of adjoining optical components. Accordingly, my invention also provides for reducing the thickness of the longitudinal section to achieve desired objectives of use.

The thickness reduction can be accomplished in a variety of ways. However, in each case, the substrate provides the support for the thinner longitudinal section. Prior to the reducing operation, the longitudinal section is attached to the substrate, preferably by fusion. Various machining operations such as grinding or etching can be used to reduce the thickness of the longitudinal section with respect to the substrate. The longitudinal section and the substrate can also be redrawn in a furnace to increase their length by a function of their corresponding reductions in width and thickness.

Redrawing (also referred to as stretching) is preferred for reducing irregularities (such as thickness variations or variations in the graded-index profile) in the longitudinal section but is limited by the corresponding reduction in the section's width. Accordingly, some machining of the longitudinal section may be needed in combination with redrawing operations. After achieving the desired thickness, the longitudinal section and the substrate can be set (e.g. cut or cleaved) in length to achieve the desired focusing qualities of the lens.

A new planar GRIN lens is also part of my invention. The lens includes a planar substrate and a section of a graded-index blank that is fixed to the planar substrate. The section is oriented on the substrate so that the section forms a step-index profile with the substrate in a first orthogonal direction and a graded-index profile in a second orthogonal direction. The first orthogonal direction is normal to an interface between the substrate and the section, and the second orthogonal direction is normal to a third orthogonal direction of intended light propagation through the section.

The substrate and the section are preferably cut to a common length in the third orthogonal direction to provide the desired focusing qualities.

The graded-index blank is preferably formed with only a negligible cladding surrounding a core. A section removed from such a blank has more useable width that enables a corresponding further reduction in section thickness during redrawing operations. Redrawing is particularly important for blanks that contain irregularities in their graded-index profiles. Other index profile perturbations, such as those close to the center of the core, can be negated by removing slightly off-axis sections of the blanks.

The sections contain top and bottom surfaces that are preferably polished or otherwise smoothed (e.g., redrawn) to remove their surface irregularities. The bottom surface is preferably fused to the substrate that forms an undercladding. A similar overcladding can also be fused to the top surface of the section. Alternatively, the overcladding can be applied by various deposition techniques appropriate to the choice of materials. Redrawing can be performed either before or after the application of the overcladding, but redrawing after has the advantage of removing surface irregularities at the section's interfaces with both the undercladding and the overcladding.

DRAWINGS

DETAILED DESCRIPTION

Figure 1:
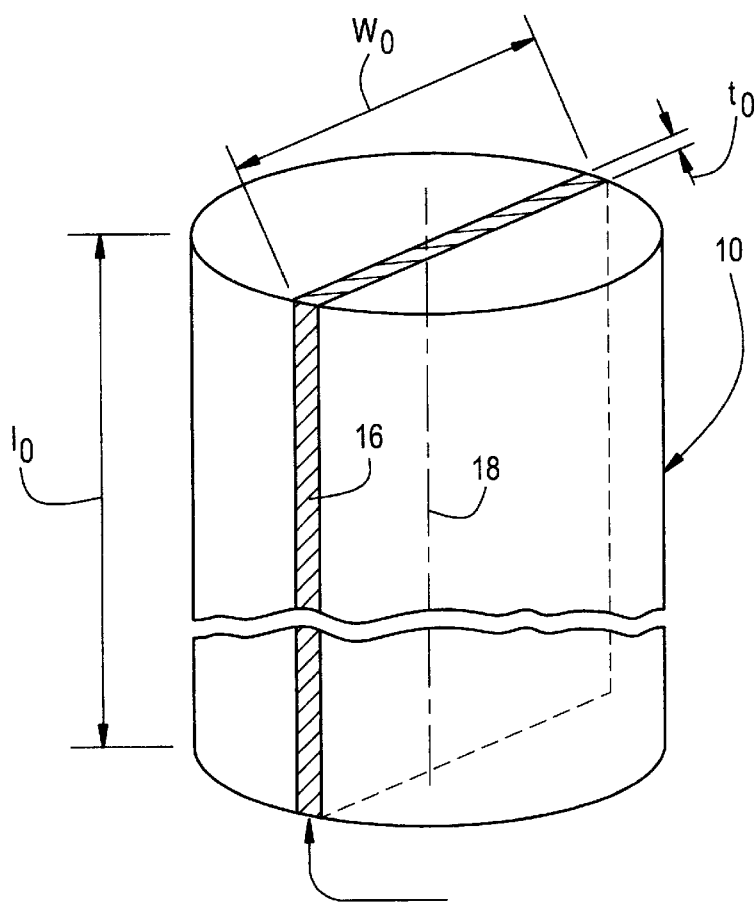
FIG. 1 is a perspective view of a graded-index blank showing the outline of a longitudinal section within the blank.
Figure 2:
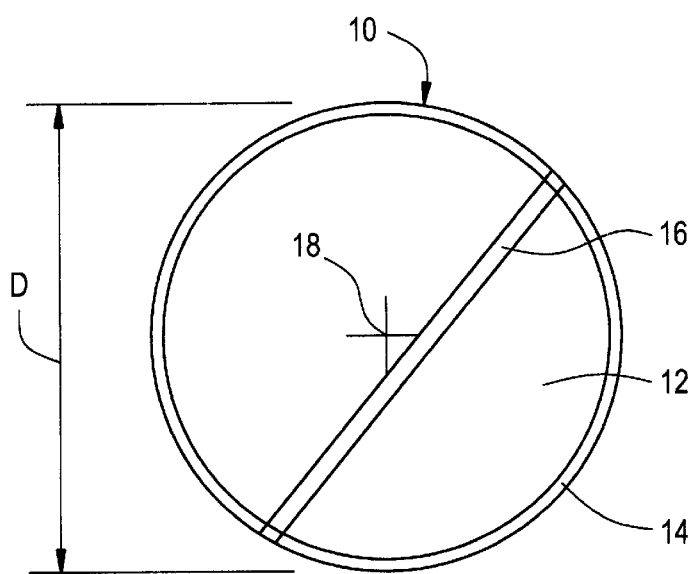
FIG. 2 is a top view of the blank showing the outline of core and cladding layers within the blank.

Two views of a graded-index blank 10 are provided by FIGS. 1 and 2. The blank 10 has a cylindrical shape and is composed of a central core 12 surrounded by a negligible cladding 14. Preferably, 90 percent or more of the blank's diameter (D) is contained within the core 12 with this percent increasing to 98 percent or more where possible.

A longitudinal section 16 of the blank 10 is shown by a distinctive pattern on the surface of the blank 10. The section 16, which has a planar form dimensioned by a length ($l_0$), a width ($w_0$), and a thickness ($t_0$), extends generally along an axis 18 of the blank 10 but can be slightly offset or inclined to the axis 18 to influence the shape of a refractive-index profile within the section 16.

Figure 3:
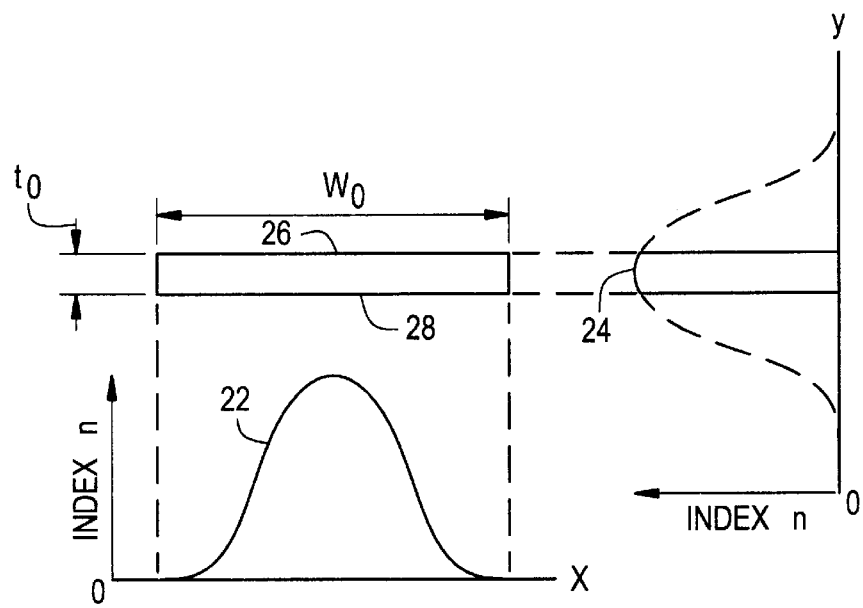
FIG. 3 is an end view of the longitudinal section along with graphs showing refractive-index profiles taken along a width and thickness of the longitudinal section.
Figure 4:
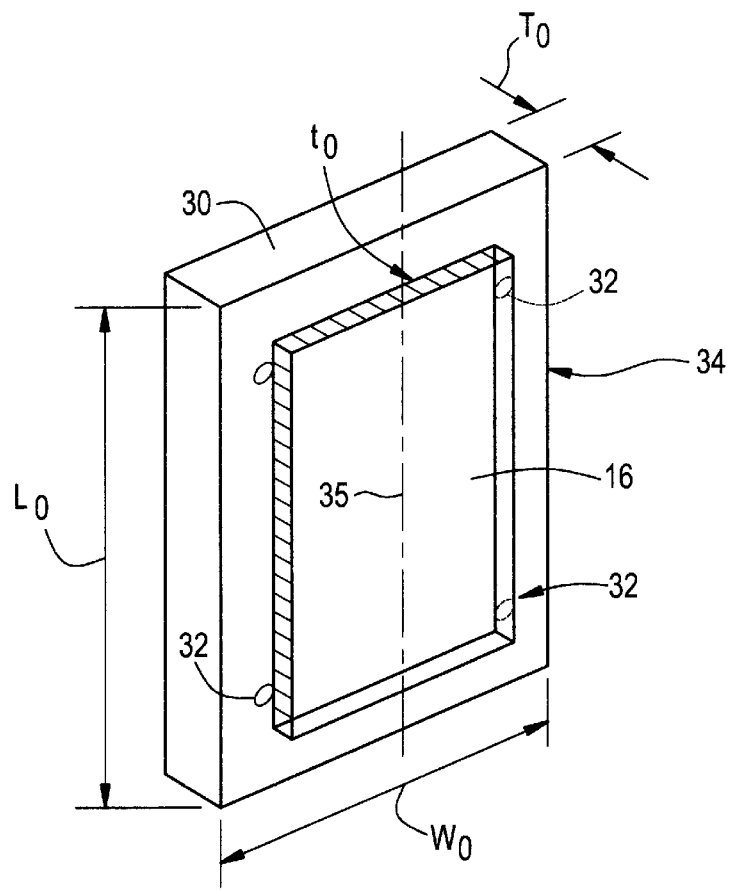
FIG. 4 shows the longitudinal section secured by frits to a substrate.

FIG. 3 shows an end view of the longitudinal section 16, along with refractive-index profiles 22 and 24, in two orthogonal directions (x and y) corresponding to the width ($w_0$) and thickness ($t_0$) of the section. The refractive-index profiles 22 and 24 reflect the original radial symmetry within the blank 10. However, while the refractive-index profile 22 along the width ($w_0$) of the section 16 contains substantially the full range of index variation in the blank 10 producing a corresponding graded-index profile, the refractive-index profile 24 through the thickness ($t_0$) contains only a small portion of that variation producing a step-index profile.

Although not shown, more than one such section 16 can be removed from the blank 10 for forming additional GRIN lenses. The sections can be removed by using a number of techniques including sawing with either a dicing saw or a wire saw. Tool marks or other irregularities in top and bottom surfaces 26 and 28 of the section can be at least partially removed by polishing.

The removed section 16 is mounted on a substrate 30 having a similarly oriented length ($L_0$), width ($W_0$), and thickness ($T_0$). Frits 32 or other securing means can be used to attach the section 16 to the substrate 30. However, the section 16 and substrate 30 are preferably fused together in a furnace to form a more permanent bond. Prior to such fusing, at least the bottom surface 28 of the section 16 is preferably polished to remove any cavities within which air could become trapped between the section 16 and the substrate 30.

The substrate 30 performs two main functions. First, the substrate 30 provides support for the section 16, which is preferably cut from the blank 10 at the thinnest practical dimension. Second, the substrate 30 functions together with the section 16 as respective cladding and core layers of a planar waveguide 34. An optical axis 35 of the planar waveguide 34 extends parallel to the length dimensions ($l_0$ and $L_0$) of the longitudinal section 16 and the substrate 30.

For most applications, the removed section 16 is expected to be too thick to function as the core layer of the planar waveguide 34, especially for single-mode applications. For example, the thinnest section that can be practically cut from a silica blank is expected to range between 300–500 microns. However, single-mode applications generally require cores of only 5–10 microns. This can be as much as a 100-fold reduction. Multi-mode applications can also require significant reductions in the section thickness ($t_0$) to provide desired performance.

Figure 5:
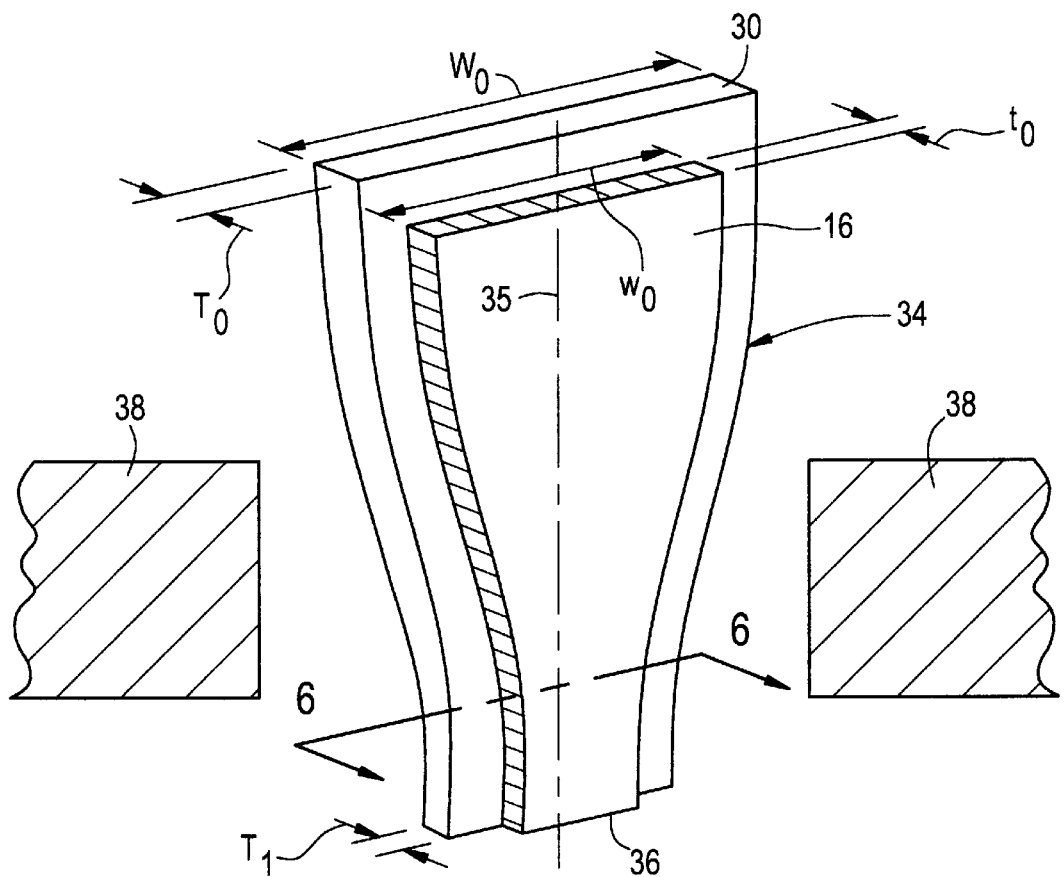
FIG. 5 is a schematic depiction of a redrawing system for reducing the combined thickness and width of the substrate and the longitudinal section through elongation.
Figure 6:
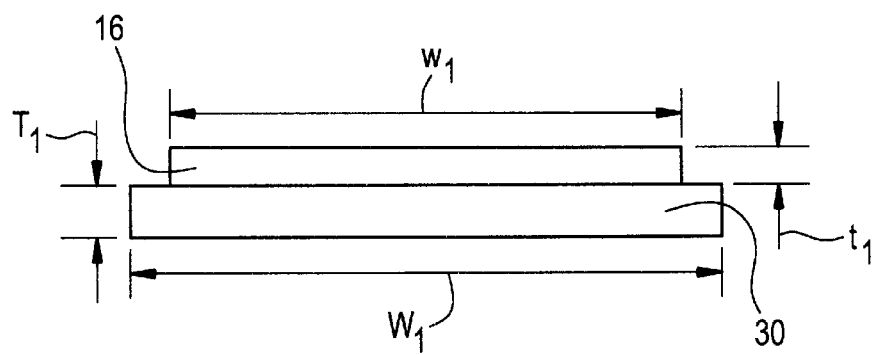
FIG. 6 is a cross-sectional view of the redrawn substrate and longitudinal section along line 6–6.

The substrate 30 provides support for machining operations on the top surface 26 of the section 16. For example, grinding or chemical etching can be used to remove some or all of the excess thickness. Any remaining surface irregularities can be removed by a smoothing operation. One possibility is to polish the top surface to final dimension. Another is the use of redraw as shown in FIGS. 5 and 6.

A leading portion 36 of the waveguide 34 is heated by a furnace 38 to a plastic state and is stretched for reducing both the thickness and the width dimensions of the section 16 and the substrate 30 from the initial dimensions ($t_0$, $T_0$ and $w_0$, $W_0$) to final dimensions ($t_1$, $T_1$ and $w_1$, $W_1$) of the waveguide. The volume of the redrawn waveguide 34 is substantially conserved, so the length dimensions increase from the initial dimensions ($l_0$ and $L_0$) to final dimensions ($l_1$ and $L_1$) at a ratio equal to a product of the reduction ratios of the corresponding changes in the thickness and the width. This relationship is expressed mathematically as follows:

$$\frac{l_1}{l_0} = \frac{t_0}{t_1} \cdot \frac{w_0}{w_1}$$

$$\frac{L_1}{L_0} = \frac{T_0}{T_1} \cdot \frac{W_0}{W_1}$$

A further description of a similar redrawing process for a planar waveguide is disclosed in my earlier U.S. Pat. No. 5,125,946, which is hereby incorporated by reference. According to the disclosed process, the thickness and width dimensions of the waveguide 34 can be expected to decrease at equal rates. The reductions can be equated mathematically to a reduction ratio (r) as follows:

$$r = \frac{w_0}{w_1} = \frac{W_0}{W_1} = \frac{t_0}{t_1} = \frac{T_0}{T_1}$$

Surface irregularities are reduced at approximately the same rate. For example, a 10-fold reduction (r) in thickness also produces a 10-fold reduction in thickness variations. Grinding and etching can leave surface variations of 5 microns or more, which is a small percentage (e.g., 5%) of a core measuring in excess of 100 microns but an unacceptably large percentage (e.g., 50%) of a single-mode core measuring less than 10 microns. Careful polishing can reduce the surface variations to 1–2 microns or less, but this can still represent a significant percentage (e.g., 10–20%) of the core thickness. Redrawing can produce much better results. The 10-fold reduction (r) example given above can reduce the 5 micron surface variations to only 0.5 microns of surface variation.

Machining can be significantly limited or avoided altogether for thinning the section 16 if the section starts with a sufficient width ($w_0$). However, in many instances, it is expected that at least some machining will be necessary to provide the required reduction in section thickness ($t_0$) without further reducing the section width ($w_0$). The final width ($w_1$) of the section can be controlled by redrawing, which also reduces variations in the graded-index profile of the section 16.

The section 16 and the substrate 30 of the waveguide 34 are cut to a common length ($l_1=L_1$) to form a planar grin lens 40 having desired focusing qualities. For example, the planar grin lens 40 can be arranged to function as a collimating lens by cutting the waveguide 34 to a so-called "quarter pitch" length. These length adjustments are well understood in the art, but more detailed explanations are found in the earlier-referenced patents to Keil et al. and Tobita et al., which are both hereby incorporated by reference.

Figure 7:
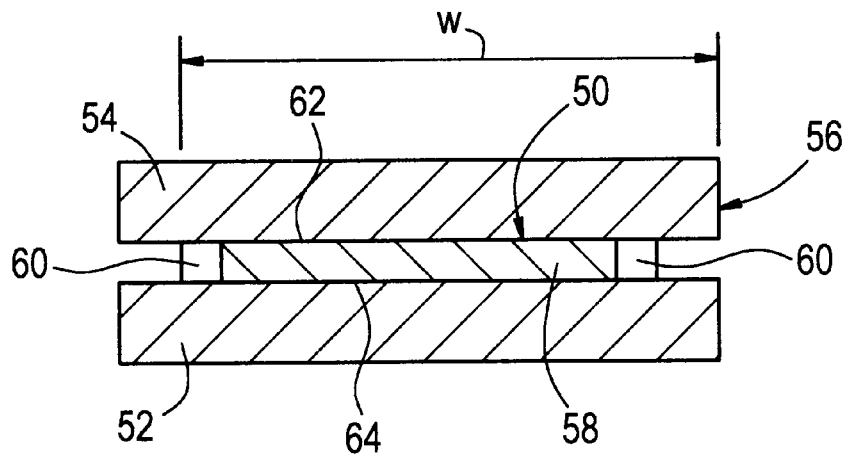
FIG. 7 is a cross-sectional view showing a similar longitudinal section located between a substrate and a superstrate for making an alternative GRIN lens having both undercladding and overcladding.
Figure 8:
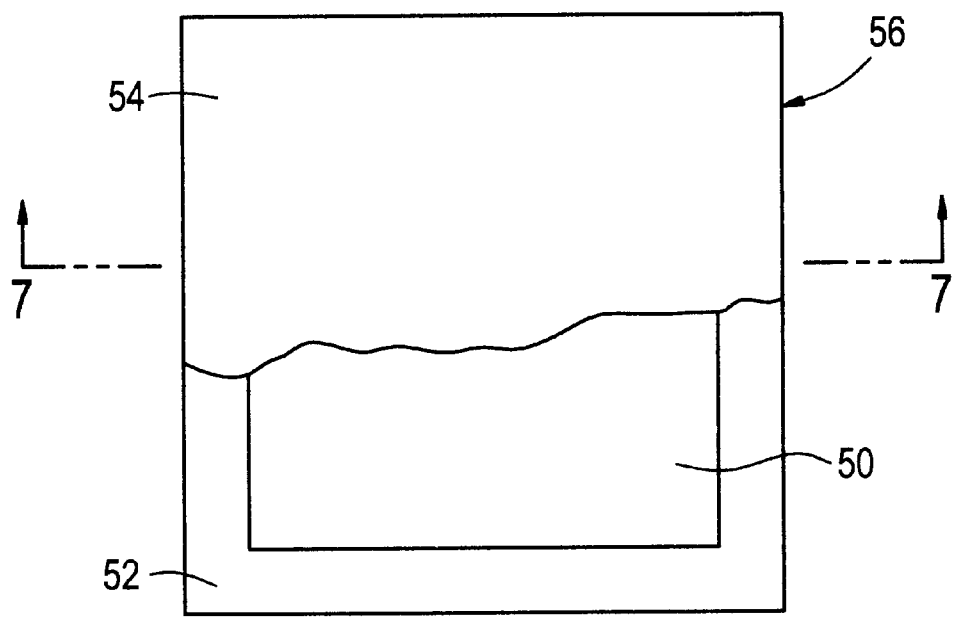
FIG. 8 is a partially cut away top view of the alternative GRIN lens.

FIG. 7 depicts another embodiment of my invention. A similar longitudinal section 50 is mounted between a substrate 52 and a superstrate 54. The longitudinal section 50 forms a core layer of a planar waveguide 56, and the substrate and superstrate 52 and 54 form respective undercladding and overcladding layers. Within the longitudinal section 50 are respective core and cladding portions 58 and 60 of the blank (not shown) from which the longitudinal section 50 is removed. Preferably, the core portion 58 is at least 90 percent of the longitudinal section's width ($w_0$). Also, the substrate 52, the superstrate 54, and the cladding portion 60 of the longitudinal section 50 preferably have the same index of refraction.

A variety of possibilities exist for assembling the waveguide 56. Preferably, the substrate 52 and the superstrate 54 are made of similar materials and are fused to opposite side surfaces 62 and 64 of the section 50 prior to redrawing the entire waveguide 56. Redrawing smoothes both interfaces formed by the section 50 with the substrate 52 and the superstrate 54. However, some machining may also be necessary to at least partially reduce the thickness of the section 50 before attaching the superstrate 54 to achieve the desired width of the waveguide 56.

Alternatively, the superstrate 54 could be attached or a comparable overcladding material could be deposited onto the section 50 after the section 50 has been reduced to a final thickness. Many overcladding materials including silica can be deposited by flame hydrolysis and subsequent consolidation or more directly by plasma-vapor deposition. Glass-melting techniques can be used for other materials.

I claim:

1. A method of making a planar gradient-index lens comprising:
   removing a longitudinal section from a graded-index blank at a first thickness;
   mounting the longitudinal section on a substrate so that the longitudinal section forms a core layer and the substrate forms a cladding layer of an optical waveguide; and
   reducing the thickness of the longitudinal section mounted on the substrate from the first thickness to a second thickness for controlling the mode of transmissions through the waveguide.

2. The method of claim 1 in which said step of reducing includes stretching the substrate together with the longitudinal section in a direction that reduces the thickness of the longitudinal section.

3. The method of claim 2 in which said step of reducing also includes heating the substrate and the longitudinal section to a plastic state.

4. The method of claim 2 including the further step of cutting the substrate and the longitudinal section to a common length.

5. The method of claim 2 in which both the substrate and the longitudinal section include respective lengths, widths, and thicknesses oriented in common directions, and said step of reducing includes stretching the substrate together with the longitudinal section in a direction that enlarges the lengths and reduces the widths and thicknesses of both the substrate and the longitudinal section.

6. The method of claim 1 in which said step of reducing includes reducing the thickness of the longitudinal section with respect to a thickness of said substrate.

7. The method of claim 6 in which said step of reducing includes machining the longitudinal section at least part way to said second thickness.

8. The method of claim 7 in which said step of reducing also includes stretching the substrate together with the longitudinal section in a direction that further reduces the thickness of the longitudinal section.

9. The method of claim 1 in which said step of mounting includes fusing the longitudinal section to the substrate.

10. The method of claim 1 including the further step of covering the longitudinal section with an overcladding.

11. The method of claim 10 in which the overcladding is a superstrate, and said step of covering includes fusing the superstrate to the longitudinal section.

12. The method of claim 10 in which said step of reducing includes stretching substrate together with the longitudinal section and the overcladding in a direction that reduces the thickness of the longitudinal section.

13. The method of claim 10 in which said step of covering includes depositing the overcladding on the longitudinal section.

14. The method of claim 1 in which the longitudinal section has top and bottom surfaces, and the bottom surface is mounted adjacent to the substrate.

15. The method of claim 14 including the further step of polishing said bottom surface prior to mounting the longitudinal section on the substrate.

16. The method of claim 15 in which said step of polishing also includes polishing the top surface of the substrate.

17. The method of claim 1 in which the first thickness of the longitudinal section is capable of supporting multi-mode transmissions through the waveguide.

18. The method of claim 17 in which the second thickness of the longitudinal section limits transmissions through the waveguide to a single mode.

19. A planar gradient-index lens made according to the method of claim 1.

20. A method of making a planar gradient-index lens comprising:

removing a planar section from a blank having a graded-index profile;

locating the planar section as a core layer of a waveguide adjacent to a layer of cladding;

orienting the planar section within the waveguide so that a graded-index profile of the planar section extends transverse to a direction of light propagation through the waveguide; and adjusting a length of the waveguide in the direction of light propagation for controlling focusing qualities of the lens.

21. The method of claim 20 in which said step of removing includes cutting the planar section from the blank.

22. The method of claim 21 including the further step of smoothing at least one of top and bottom surfaces of the planar section cut from the blank.

23. The method of claim 22 in which the layer of cladding is formed by a substrate, and said step of locating includes mounting the bottom surface of the planar section on the substrate.

24. The method of claim 23 in which said step of smoothing includes smoothing the bottom surface of the planar section prior to mounting the planar section on the substrate.

25. The method of claim 24 in which said step of mounting includes fusing the bottom surface of the planar section to the substrate.

26. The method of claim 22 in which said step of smoothing includes redrawing the waveguide through a furnace.

27. The method of claim 20 in which said planar section and said cladding have respective lengths, widths, and thicknesses.

28. The method of claim 27 in which the graded-index profile of the planar section extends across its width.

29. The method of claim 28 in which the planar section and the cladding have a step-index profile through their respective thicknesses.

30. The method of claim 27 including the further step of reducing the thickness of the planar section.

31. The method of claim 30 in which said step of reducing includes machining the planar section.

32. The method of claim 30 in which said step of reducing includes reducing the thicknesses of both the planar section and the cladding.

33. The method of claim 32 in which said step of reducing includes enlarging the lengths and reducing the widths and thicknesses of both the planar section and the cladding.

34. The method of claim 33 in which said step of reducing includes stretching said planar section and the undercladding.

35. The method of claim 34 in which said step of stretching is accompanied by a step of heating the planar section and the undercladding.

36. The method of claim 27 in which said step of locating the planar section includes locating the planar section between layers of undercladding and overcladding.

37. The method of claim 36 including the further step of reducing a thickness of the planar section.

38. The method of claim 37 in which said step of reducing also includes reducing thicknesses of the layers of undercladding and overcladding.

39. The method of claim 38 in which said step of reducing includes stretching the planar section together with the undercladding and overcladding.

40. The method of claim 36 in which said step of locating includes depositing the layer of overcladding on the planar section.

41. The method of claim 40 including the further step of reducing the thickness of the planar section independently of respective thicknesses of the undercladding and overcladding.

42. The method of claim 41 in which said step of reducing includes machining the planar section.

43. The method of claim 20 in which said blank includes a core surrounded by a cladding, and said planar section includes portions of both the blank core and the blank cladding.

44. The method of claim 43 in which said undercladding has a refractive index that matches a refractive index of the blank core portion of said planar section.

45. A planar gradient-index lens made according to the method of claim 20.

* * * * *